United States Patent
Yasui

[19]
[11] Patent Number: 6,081,615
[45] Date of Patent: Jun. 27, 2000

[54] IMAGE-PROCESSING DEVICE AND METHOD OF IMAGE-PROCESSING

[75] Inventor: Keisuke Yasui, Tokyo, Japan

[73] Assignee: Kabushiki Kaisha Sega Enterprises, Tokyo, Japan

[21] Appl. No.: 09/102,755

[22] Filed: Jun. 23, 1998

[30] Foreign Application Priority Data

Jun. 24, 1997 [JP] Japan .................................... 9-167442

[51] Int. Cl.$^7$ ....................................................... G06K 9/00
[52] U.S. Cl. ........................................... 382/162; 382/260
[58] Field of Search .................................... 382/162, 163, 382/164, 165, 166, 167, 168, 169, 181, 243, 254, 199, 200, 201, 256, 257, 258, 259, 260, 261, 262, 263, 264, 265, 266, 267, 269, 270, 271, 272, 273, 274, 275, 286, 293, 298, 299, 300, 308; 348/438, 403, 620, 423, 407, 699; 358/432, 455; 345/132, 138, 149, 428

[56] References Cited

U.S. PATENT DOCUMENTS

4,851,825  7/1989  Naiman .................................. 340/728

*Primary Examiner*—Bijan Tadayon
*Attorney, Agent, or Firm*—Finnegan, Henderson, Farabow, Garrett & Dunner, L.L.P.

[57] ABSTRACT

By fixing the area of interpolation or by enlarging it at a ratio smaller than the magnification ratio of texture cells in relation to pixels, to provide an image-processing device and method of image-processing whereby the display image is not subject to excessive fuzziness. CPU 1 determines the display position of objects including texture on the display image. A texture calculator 3 calculates and determines the coordinates of the pixels on the actual display image which correspond to each texture cell. On the basis of these coordinates, a texture interpolator 5 extracts texture data from a texture memory 4, and determines the value of each pixel on the actual display image in accordance with this data. The texture interpolator 5 employs a box filter to determine the interpolation area, but since the size of the box filter is fixed at the same size as that of the pixels which constitute the display image, it does not create any excessive fuzziness on the display image.

6 Claims, 12 Drawing Sheets

IMAGE-PROCESSING DEVICE AND METHOD OF IMAGE-PROCESSING

BACKGROUND OF THE INVENTION

1. Field of the Invention

The present invention generally relates to an improved image-processing device for use in graphics display, and to an improved method of image-processing. In particular it relates to an image-processing device and a method of image-processing wherein no excessive fuzziness is generated when colour boundaries are interpolated.

2. Description of the Related Art

In computer graphics, objects are arranged in virtual space, after which texture is applied to the surface of the objects to represent the surface pattern. The process of creating a two-dimensional display image from this object data is known as 'rendering', while the image which results from rendering an object with applied texture is referred to as a 'textured image'. During the process of rendering, an image as seen from the viewpoint position is created for each object in the virtual space. The texture of the object and the display image both consist of cells (unit areas) arranged vertically and horizontally, with the coloring designated cell by cell. The cells which constitute the texture are known as texture cells, while those which constitute the display image (picture) are called pixels.

A comparison between texture cells and pixels reveals that whereas pixels are arranged on the display image, texture cells are arranged irrespective of the pixels or viewpoint position in line with the direction of the surface of the object As a result, it is necessary during rendering to process (map) each texture cell of the object and allocate it to a pixel on the display image in accordance with the viewpoint position. This process is referred to as texture mapping. For instance, what is a perfect rectangle in virtual space must be mapped in a trapezoidal or rhombic shape on a display image which is viewed obliquely.

Texture mapping assumes a jaggy appearance if the texture is magnified in relation to the pixels. That is to say, if the viewpoint position is close to the object, the object is represented large on the display image, so that during texture mapping the texture of the object is expanded more than the pixels. Thus, inasmuch as the pixels are rectangular, the colour boundaries of the texture cells, which are the constituent units of texture, create a step-like or jaggy pattern on the display image (actual image), and may spoil it. The phenomenon whereby this jaggy appearance makes the image look unnatural is known as aliasing, and the term 'anti-aliasing' refers to methods of preventing this.

Anti-aliasing to reduce the jaggy appearance is effected by means of interpolation of texture data. This interpolation involves blending (mixing) the colors of adjacent texture cells in order to obscure the difference. In this manner the step-like jaggy appearance ceases to be so prominent. A method known as a box filter has conventionally been employed in determining the area which is to be subject to interpolation. The box filter is the same size as a texture cell, and seeks to produce a texture image corresponding to pixels on the screen.

Figure 12:
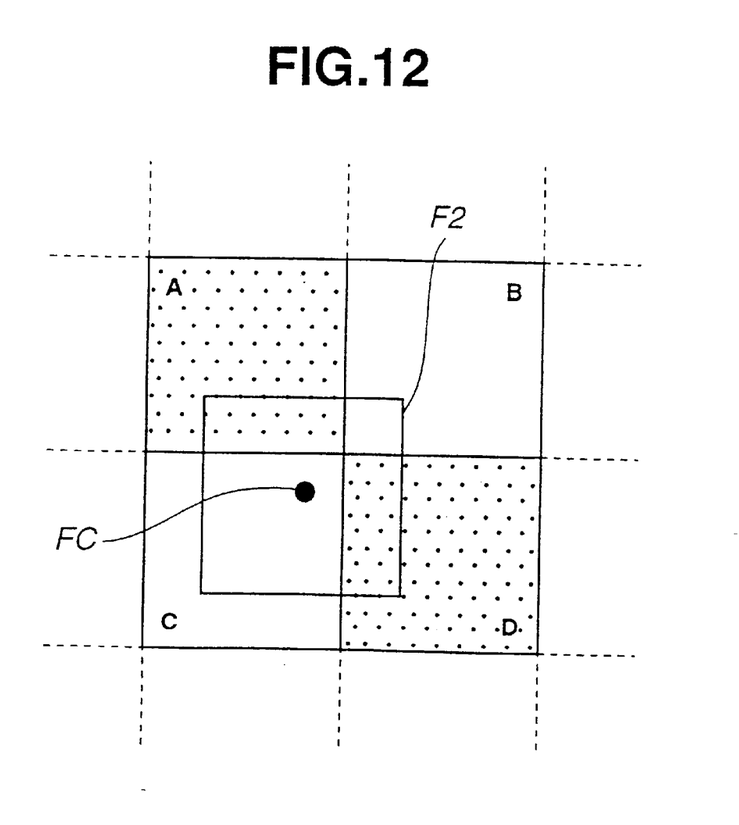
FIG. 12 is a diagram illustrating a conventional box filter.

FIG. 12 illustrates the relationship between texture cells A, B, C, D and a conventional box filter F2. As the drawing shows, the conventional box filter F2 is a rectangular area defined as equal in size to the texture cells A, B, C, D. A color value, or data representing color. is defined for each of the texture cells A, B, C, D. Texture mapping utilizes the color values of the texture cells to determine the color values of each of the corresponding pixels.

In other words, for each of the texture cells A, B, C, D which overlap the box filter F2, the color values are blended in proportion to the area of overlap. This becomes the color value of the area which corresponds to the box filter F2, and is mapped on the pixels. For instance, if the box filter F2 is astride equal areas of black and white, the color value for the area of the box filter F2 becomes grey.

Of the four texture cells A, B. C, D which overlap the box filter F2 in the example illustrated in FIG. 12, the one with the greatest area of overlap is the texture cell C. This means that it is the color value of the texture cell C which will be reflected most prominently in the color value of the box filter F2.

Interpolation by means of a box filter in this manner is applied to the whole area or to the edge section of a texture cell by gradually increasing the x and y coordinates of the interpolation area. Thus, the color of adjoining sections of texture cells of the same color remains unchanged, while adjoining edge sections where the color is different are subject to gradation. As a result, color changes in the edge sections become smoother, and the jaggy appearance is reduced. The reason for adopting an integer-type box-shaped boundary when determining the targets of interpolation is that it is difficult for a computer, which depends on binary data (1 or 0), to calculate non-integer-type boundary shapes such as curved lines.

Interpolation makes it possible to prevent obvious jagginess, but where the magnification ratio increases for textures with well-defined lightness and darkness, it works beyond what is required. The result is that the edges of the texture image become too fuzzy, and this needs to be rectified.

Figure 13:
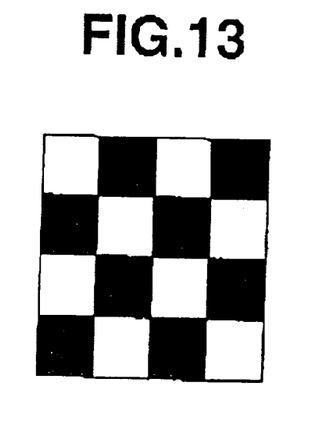
FIG. 13 is a diagram showing an example of texture.
Figure 14:
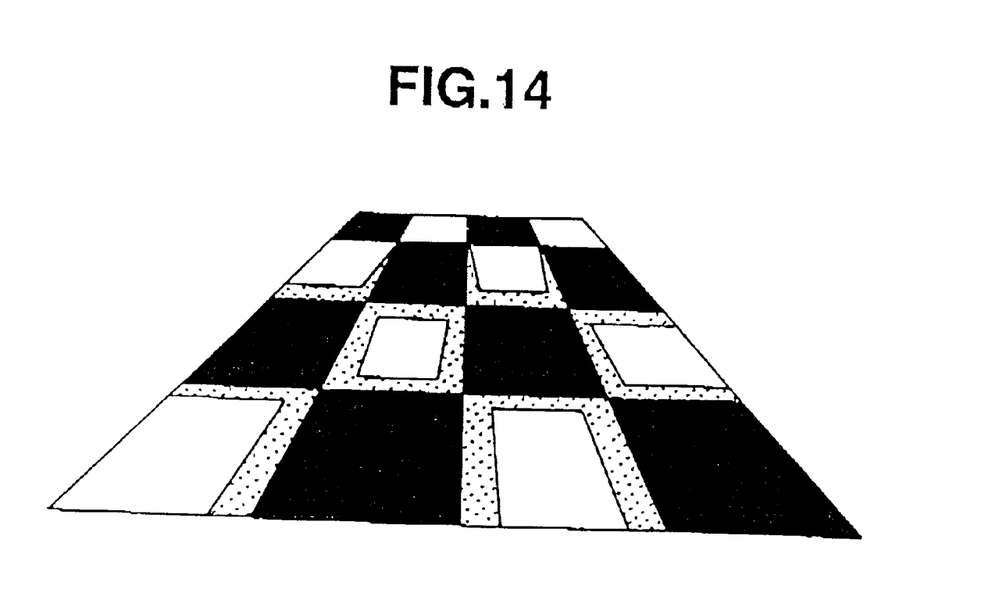
FIG. 14 is a diagram demonstrating the results of conventional mapping of the texture illustrated in FIG. 13.

In other words, the size of the box filter has conventionally been determined on the basis of the texture cell. This means that box filters which are applied to sections where the texture cells are considerably magnified in relation to the pixels are also magnified, and the extent of the fuzziness increases in proportion to the size of the box filter, For example, FIG. 14 demonstrates the results of conventional mapping of the texture illustrated in the preceding FIG. 13. The areas of intermediate color in FIG. 14 represent the extent of the fuzziness resulting from interpolation. At the back (the top in FIG. 14), where the magnification ratio is small, box filter size is small and therefore the extent of the fuzziness is not obvious This is not true, however, at the front (the bottom in FIG. 14), where the extent of the fuzziness determined by the box filter increases with the texture cell and becomes very obvious.

Thus, there has hitherto been a problem in that the edges (color boundaries) of texture with well-defined lightness and darkness have been excessively fuzzy where the magnification ratio was greatest, thus spoiling the image, For this reason it has been necessary to prepare texture data without excessive fuzziness for use in magnified display, with consequent problems of software and increased data area.

SUMMARY OF THE INVENTION

The present invention has been designed with a view to solving conventional problems of the type outlined above, it being an object thereof to provide an image-processing device and method of image-processing whereby the display image is not subject to excessive fuzziness. It is a further object of the present invention to provide a compact high-speed image-processing device by fixing the size of the interpolation area.

It is another object of the present invention to provide an image-processing device wherein by ensuring that the interpolation area is magnified by a ratio smaller than that of the texture cells, jagginess is effectively reduced even where the magnification ratio is great. It is yet another object of the present invention to provide an image-processing device wherein display images true to image content and other conditions are created by adopting a prescribed function to determine the interpolation area from the magnification ratio of the texture cells.

With a view to attaining the abovementioned objects, the invention described is an image-processing device, having means of interpolation whereby during mapping of texture cells representing the surface pattern of the object which is to be displayed, colour boundaries are interpolated by blending the colours of the texture cells contained within prescribed limits, wherein the means of interpolation has; means of calculating the magnification ratio, whereby the magnification ratio of the texture cells in relation to the pixels is calculated; means of determining size, whereby the size of filter for stipulating the area which is subject to interpolation is determined in accordance with the calculated magnification ratio; means of determining position, whereby a filter of the stipulated size is moved one by one over the texture cells which are to be mapped, and the position is determined: means of extraction, whereby the colour values of the texture cells which overlap with the filter in each position are extracted; means of blending (or adding) colour values, whereby extracted colour values for every texture cell are blended (or added) in proportion to the area of overlap between the texture cell in question and the filter; and means of mapping, whereby the blended colour values are mapped on each pixel which corresponds to a position of the filter.

The another invention is a method of image-processing, including a process of interpolation whereby during mapping of texture cells representing the surface pattern of the object which is to be displayed, colour boundaries are interpolated by blending the colours of the texture cells contained within prescribed limits, wherein the process of interpolation comprises the steps of: calculating the magnification ratio of the texture cells in relation to the pixels; determining the size of filter for stipulating the area which is subject to interpolation in accordance with the calculated magnification ratio; determining position, whereby a filter of the stipulated size is moved one by one over the texture cells which are to be mapped, and the position is determined; extraction, whereby the colour values of the texture cells which overlap with the filter in each position are extracted; blending colour values, whereby extracted colour values for every texture cell are blended in proportion to the area of overlap between the texture cell in question and the filter; and mapping, whereby the blended colour values are mapped on each pixel which corresponds to a position of the filter.

These inventions makes it possible, even where the texture has been magnified in relation to the pixels, to avoid the phenomenon whereby the interpolation area is magnified in proportion to the texture. This serves to eliminate excessive fuzziness in the edge sections of the display image.

In the another aspect of this invention directed to the Image Processing, the means of determining size is structured in such a manner that the size of the filter is fixed at a prescribed size based on the size of the pixel. Inasmuch as the size of the filter is fixed, the invention described in claim 2 makes it possible to simplify the processing procedures and structure, thus producing a compact high-speed image-processing device.

In the another aspect of this invention for the Image Processing, the means of determining size is structured in such a manner that the size of the filter is magnified by a ratio which is smaller than the magnification ratio of the texture cells in relation to the pixels. The invention described in claim 3 allows the size of the filter to be magnified to a certain extent, albeit by a ratio which is smaller than the magnification ratio of the texture cells. This is more effective than fixed filter size in reducing Bagginess where the magnification ratio is great.

The means of determining size of the further another aspect of this Image Processing device is structured in such a manner that the size of the filter is determined by means of the magnification ratio of the texture cells in relation to the pixels, and a prescribed function. This Image Processing technology permits use of a desired function to determine the interpolation area. For instance, suppose the size of one side of the interpolation area is determined not by the magnification ratio but by a value obtained by integrating the square root of the scaling factor: the scaling factor is only three times where the magnification ratio is ten times. The fact that it is possible to employ the desired function in this manner allows an interpolation area to be obtained which suits conditions such as the content of the display image, the type of calculation processing mechanism and the resources available.

DESCRIPTION OF THE PREFERRED EMBODIMENTS

There follows, with reference to the drawings, a detailed description of the preferred embodiments of the present invention.

(1) Structure

Figure 1:
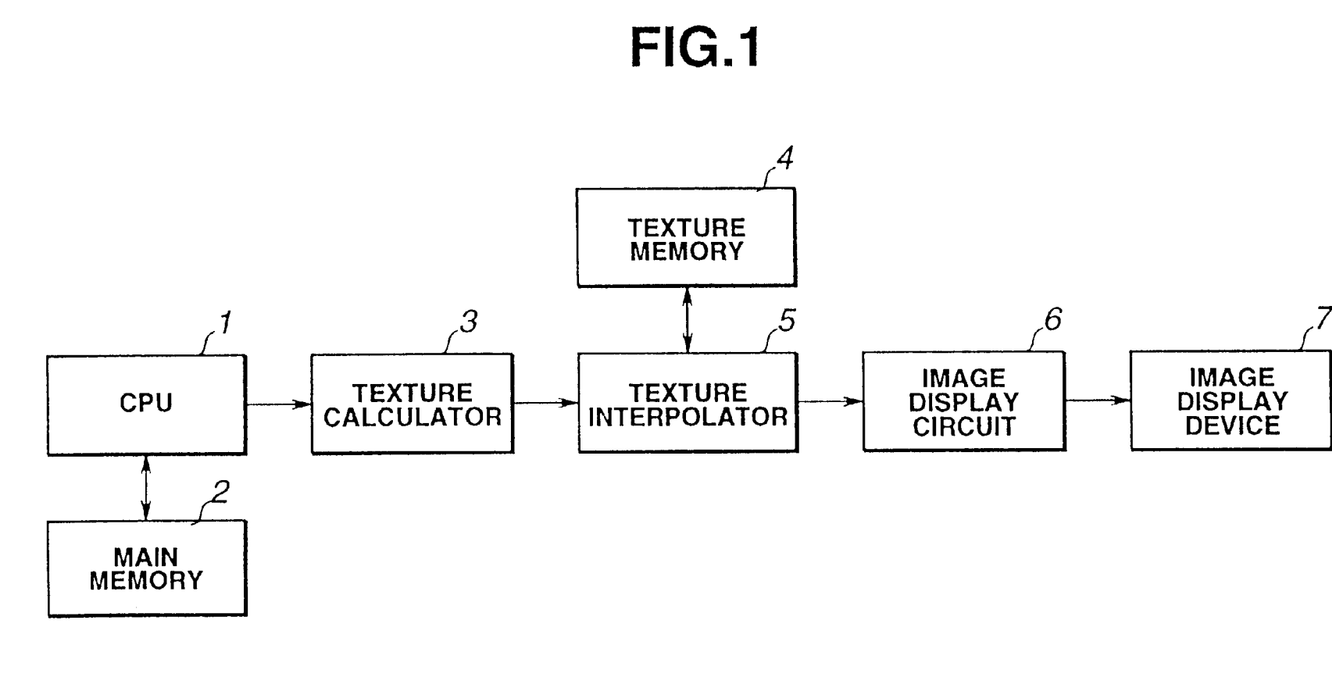
FIG. 1 is a functional block diagram illustrating the structure of the image-processing device to which an embodiment of the present invention pertains.

The present embodiment relates to an image-processing device ('the present device') which corresponds to claims 1 and 2, and to a method of image-processing which corresponds to claim 5 and is implemented with the aid of this image-processing device. FIG. 1 is a functional block diagram illustrating the structure of the present device. As FIG. 1 shows, the present device has a CPU 1 which determines the position in which an object with texture is displayed on a display image, and a main memory 2 which the CPU 1 accesses in order to obtain various kinds of data. The present device also has a texture calculator 3 which calculates on the basis of the display position determined by the CPU 1 the coordinates of the pixels to which each texture cell corresponds on the display image, and a texture memory 4 which stores data relating to each texture. The present device also has a texture interpolator 5 corresponding to what in claim 1 is referred to as a 'means of interpolation', which extracts texture data from the texture memory 4 on the basis of the coordinates calculated by the texture calculator 3, and while interpolating in accordance with this data determines and maps the value of each pixel on the actual display image. The present device also has an image display circuit 6 which utilises the data on each pixel to generate an image signal, and an image display device 7 which displays the image in accordance with the aforesaid image signal.

Figure 2:
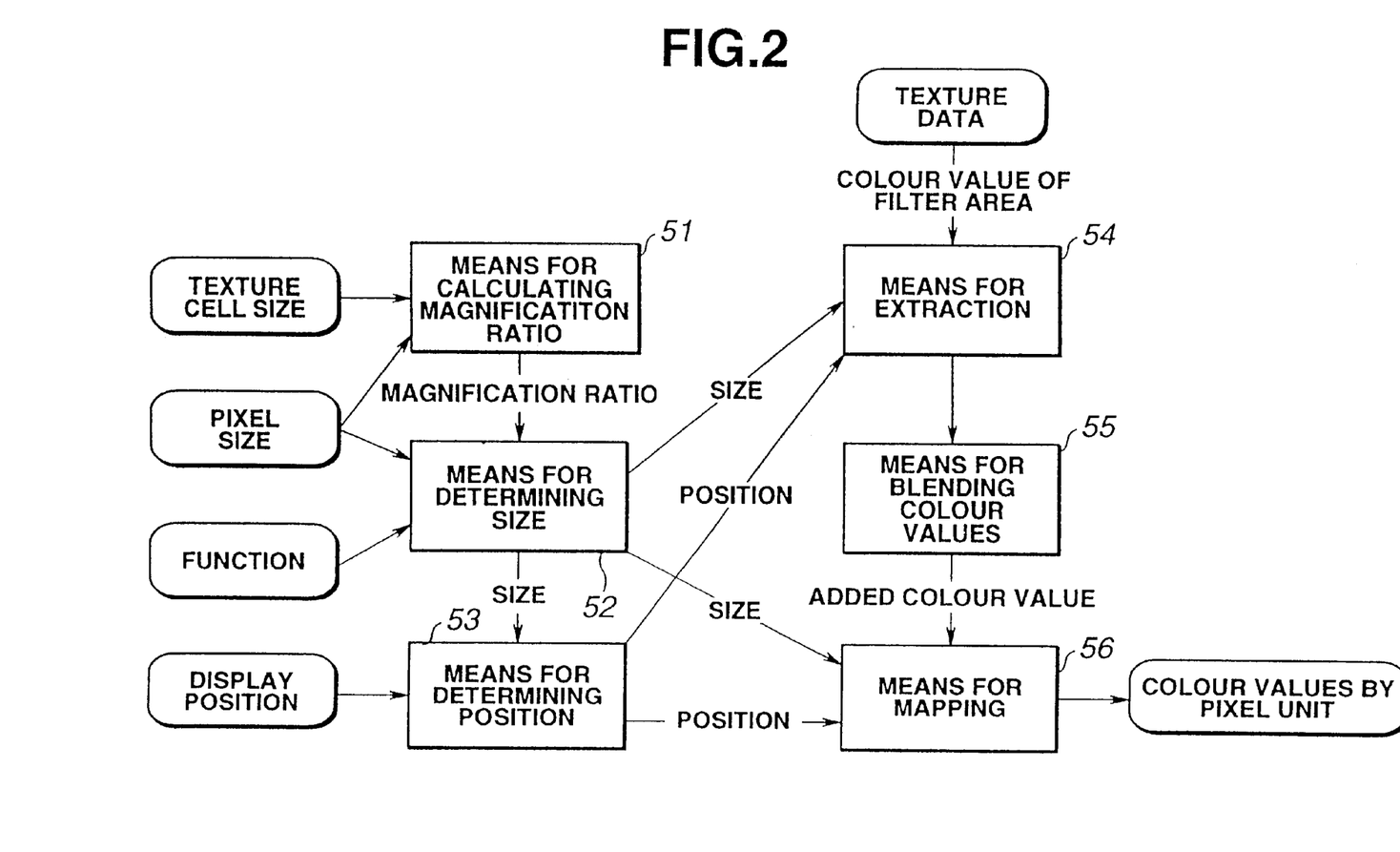
FIG. 2 is a functional block diagram illustrating the detailed structure of the texture interpolator in an embodiment of the present invention.

FIG. 2 is a functional block diagram illustrating the detailed structure of the texture interpolator 5. The texture interpolator 5 has means of calculating magnification ratio 51, which on the basis of texture cell size and pixel size calculates the magnification ratio of the texture cells in relation to the pixels, and means of determining size 52, which on the basis of the calculated magnification ratio and the pixel size determines the size of the box filter corresponding to what in claims 1–5 is referred to simply as a 'filter' (filter size). A function is used to determine in advance the relationship between the magnification ratio and pixel size on the one hand and the size of the box filter on the other. By correctly determining this function it is possible to fix the filter size the same as the pixel size.

The texture interpolator 5 also has means of determining position 53 which determines the position of the box filter in accordance with the display position of the object on the display image, and means of extraction 54 which extracts the colour values of each texture cell which overlaps the filter of determined position and size. The texture interpolator 5 also has means of blending colour values 55 which blends the extracted colour values in ratios corresponding to the area of overlap between texture cell and filter, and means of mapping 56 which maps the calculated colour values on the pixels corresponding to the filter.

(2) Action and Effect (2-1) Overall Processing Procedure

In the present embodiment, which is structured as described above, image display is implemented in the following manner (FIG. 1). First of all, the CPU 1 accesses the main memory 2 and determines the position in which the object with texture is displayed on the display image. For instance, if the shape data, position coordinates and direction vectors of the object in virtual space are stored in the main memory 2 along with viewpoint position coordinates and direction vectors, the CPU 1 calculates on the basis of this data the position occupied on the display image by the object as seen from the viewpoint.

The calculated display position is fed to the texture calculator 3, which then calculates and determines the coordinates of the pixels on the display image where the texture cells of the object are to be mapped. The texture interpolator 5 extracts the texture data from the texture memory 4, and on the basis of the extracted texture data determines the colour values of the pixels with the coordinates determined by the texture calculator 3. The data for each pixel is displayed via the image display circuit 6 by the image display device 7.

(2-2) Box Filter

Interpolation is performed by the texture interpolator 5 when the pixel values are determined, and a box filter is employed for the purpose of this interpolation In the present embodiment, the box filter is placed on the texture image coordinates which correspond to the centre of a pixel on the display image. In other words, the centre position of the box filter is defined in such a manner that it tallies with the centre position of each pixel on the display image. The box filter determines the image of the pixels in accordance with the colour values for each texture cell occupying the filter. The size of the box filter may be determined by the size of the pixels and that of the display texture, but the size of the box filter which determines the interpolation area is fixed at the same size as that of the pixels. Fixing the size of the filter in this manner makes for simplification of the processing procedure and structure, as well as facilitating greater compactness and higher speed in the image-processing device.

Figure 3A:
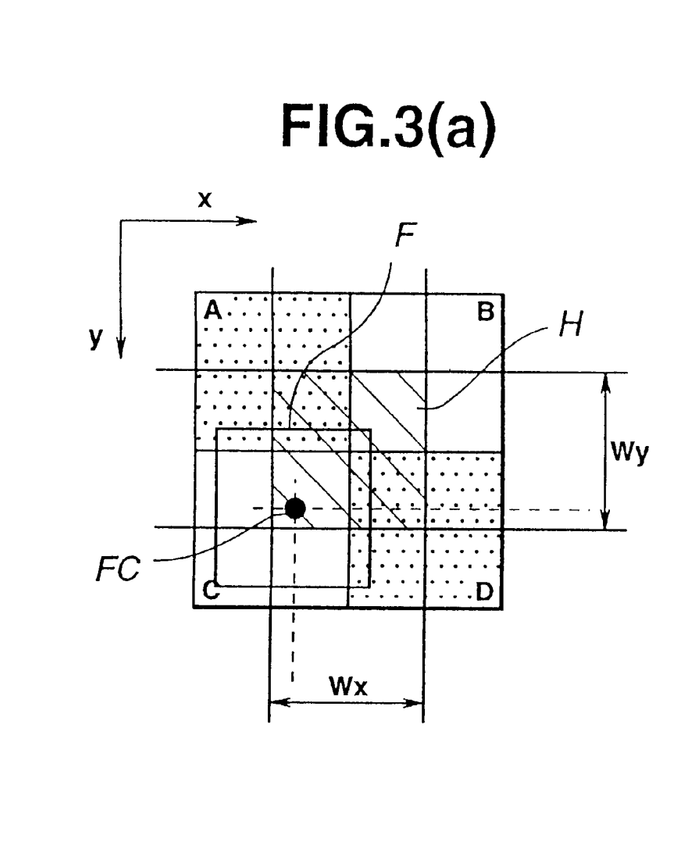
FIG. 3 is a diagram showing the interpolation area in an embodiment of the present invention.

FIG. 3(a) is a diagram showing the interpolation area in the present embodiment where the ratio of pixel size to texture cell size is 1:1. In this drawing, the colour values of the four texture cells A, B, C, D which overlap the filter F are the target of interpolation. To be more precise, the colour values of the pixels corresponding to the box filter F are determined by blending the colour values of the texture cells A, B, C, D in proportion to the area of overlap with the box filter F.

In the case of FIG. 3(a) the interpolation area is the same as the conventional one, and it is for example when the centre point of the box filter F is situated within a rectangular interpolation area H specified by an interpolation area Wx in the x direction and an interpolation area Wy in the y direction that the colour values of the four texture cells A, B, C, D are included simultaneously in the colour value of (the pixels corresponding to) the box filter F.

Figure 3B:
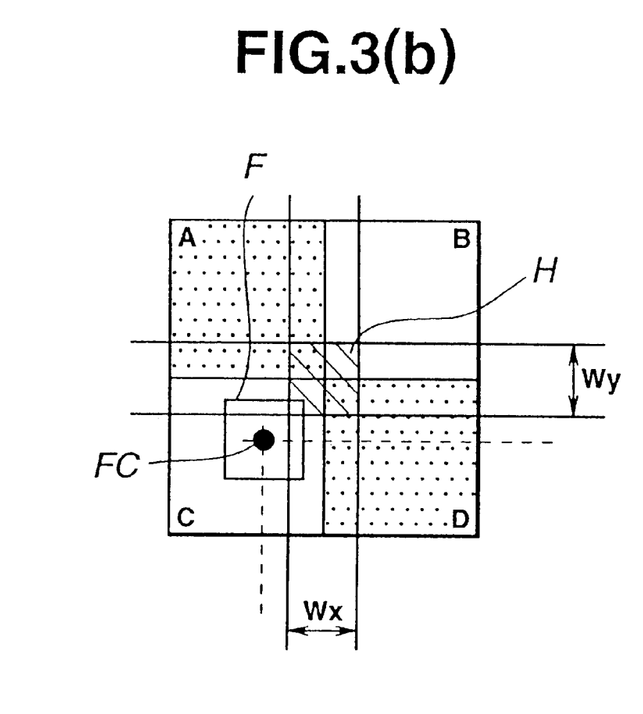

FIG. 3(b) is a diagram showing the interpolation area where the ratio of pixel size to texture cell size is 1:2. In this case the size of the box filter F is reduced relative to the texture cell size, and becomes ¼ in terms of area ratio. As a result, even coordinates which have hitherto been interpolated are no longer targets for interpolation. When in the present embodiment the texture cells are magnified in this manner vis-a-vis the pixels, the area over which interpolation is effective is less than it is conventionally. Accordingly it is possible to reproduce a sharper texture by interpolating only in the vicinity of the edges.

In other words, the interpolation area H is reduced in relation to the four texture cells A, B, C, D in the same way as the box filter F. A comparison between FIG. 3(a) and (b) will show that the centre point FC of the box filter F is situated in the same position within the same texture cell C, but that while the texture cells A, B, C, D are targets for interpolation in FIG. 3(a), in FIG. 3(b) they are not.

(2-3) Procedure for Interpolation Using a Box Filter

Figure 4:
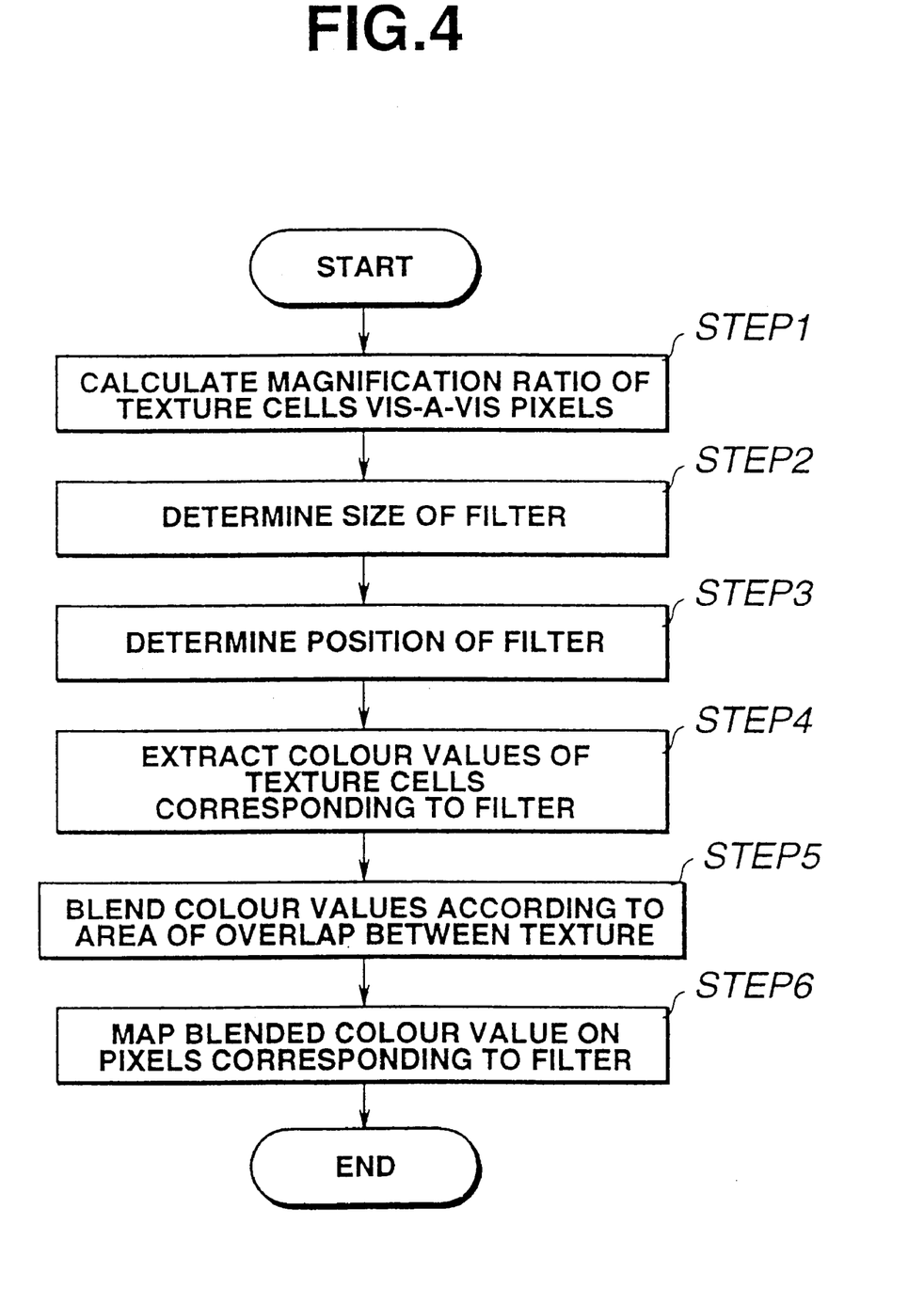
FIG. 4 is a flowchart depicting the procedures involved in interpolation in an embodiment of the present invention.

FIG. 4 is a flowchart illustrating the detailed procedure for interpolation using a box filter as described above. First, on the basis of the size of the texture cells and the pixels the means of calculating the magnification ratio 51 calculates the magnification ratio of the texture cells vis-a-vis the pixels (step 1). Then, the means of determining size 53 determines the size of the box filter (filter size) in accordance with the calculated magnification ratio and pixel size (Step 2). Here, a function is used in order to determine in advance the relationship between magnification ratio and pixel size on the one hand and the size of the box filter on the other.

On the basis of the filter size determined in this manner and the display position of the object on the display image, the means of determining position 53 determines the position of the filter (Step 3). Then, the means of extraction 54 extracts from the texture data the colour values of the texture cells which overlap the filter of the size and position determined (Step 4). After that, the means of blending colour values 55 blends the extracted colour values in a ratio corresponding to the area of overlap between the texture cells and the filter (Step 5), and the means of mapping 56 maps the blended colour values on the pixels which correspond to the position of the filter (Step 6).

(2-4) Example of the Use of a Box Filter

Figure 5A:
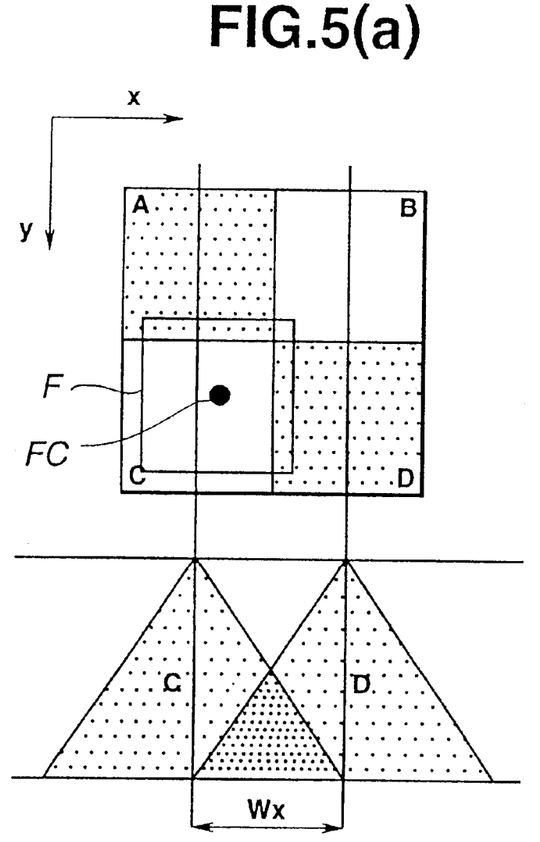
FIG. 5 is a diagram demonstrating the relationship between the position of the centre point of the box filter in the direction of the x axis and the degree to which the colours value of texture cells are included in the colour value of the area corresponding to the box filter in an embodiment of the present invention.

FIG. 5(a) and (b) correspond respectively to FIG. 3(a) and (b), and demonstrate the relationship between the position of the box filter F and the degree to which the colour values of the texture cells C, D are included in the colour value of the box filter F. In FIG. 5, the size of the box filter F changes according to the size of the corresponding texture cells on the actual screen. As a result, the interpolation area decreases as the texture image becomes larger, allowing a sharper texture image to be displayed. In FIG. 5(a), (b), for instance, the triangles C, D correspond to positions in the x direction of the centre point FC of the box filter F, and represent respectively the extent to which the colour values of the texture cells C. D are included in the colour value of the box filter F. The area where the two triangles C, D overlap is where the colour values of the texture cells C, D mingle, and tallies with the width Wx in the x direction of the interpolation area.

Figure 5B:
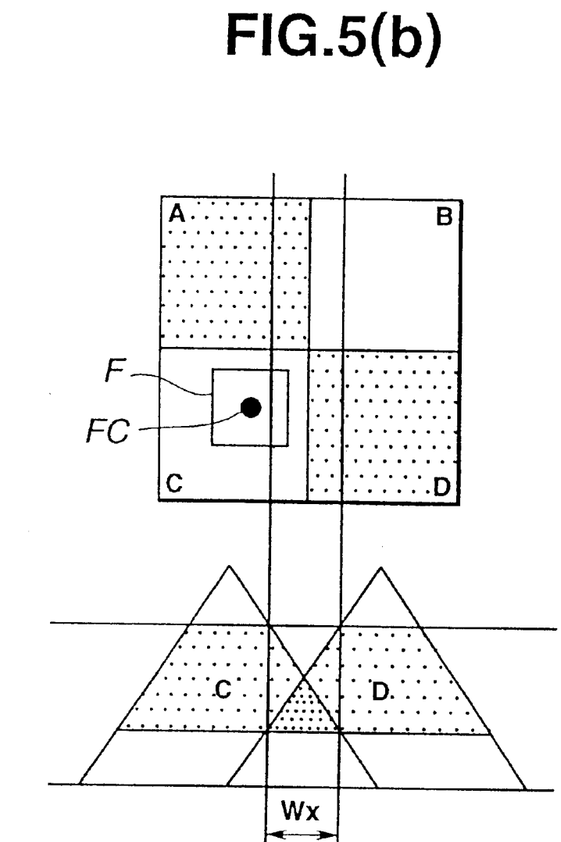

In comparison with FIG. 5(a) where the ratio of pixel size to texture cell size is 1:1, it will be seen that the ratio of 1:2 in FIG. 5(b) means that the width of the triangular area of overlap in the x direction is halved, as is also the interpolation area Wx. In this manner, the present embodiment serves to ensure that the interpolation area is not magnified excessively even if the texture is, and that a sharp display image can be obtained without any fuzziness at the edges.

Figure 6:
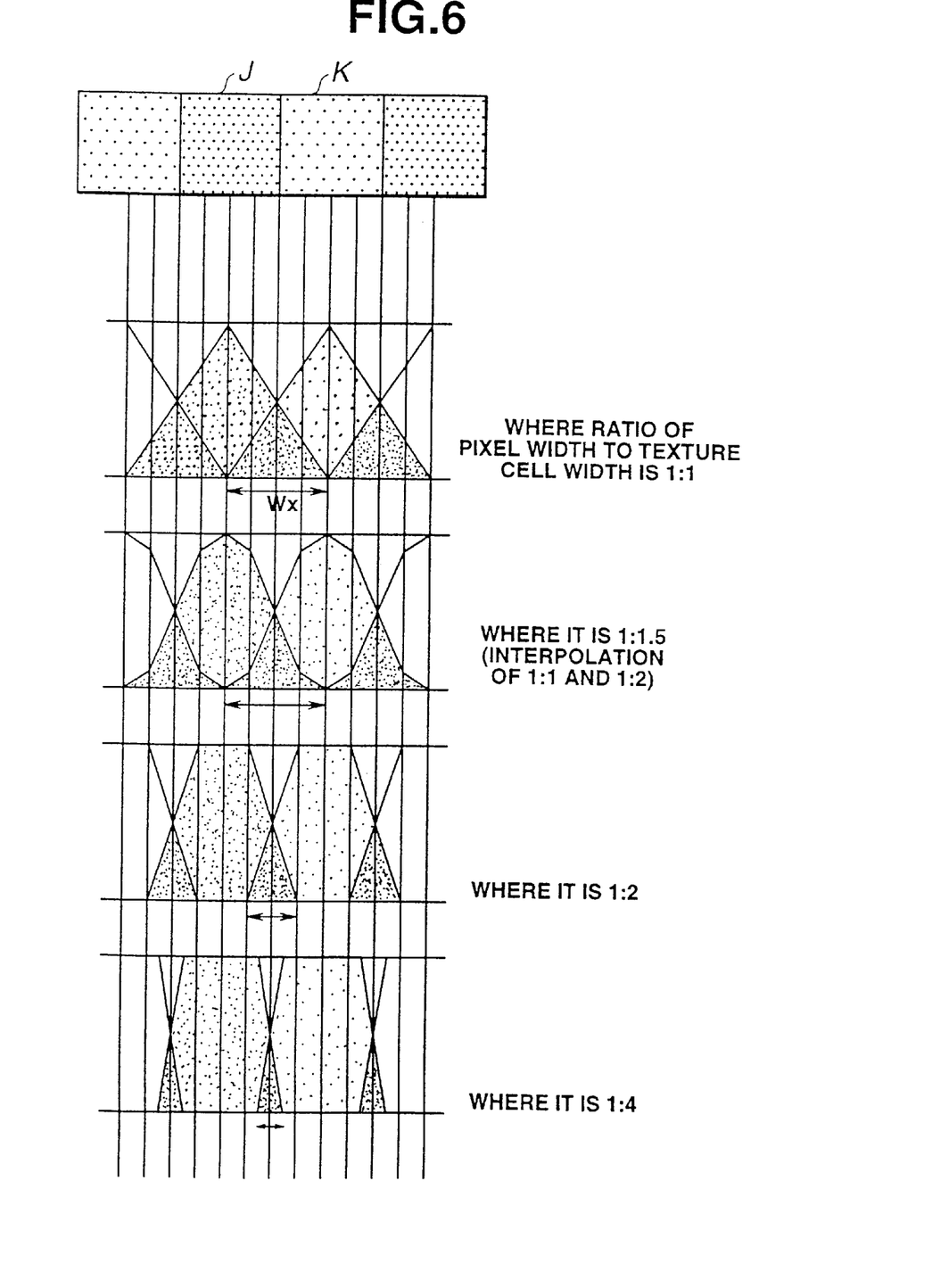
FIG. 6 is a diagram demonstrating for each magnification ratio of texture cells in relation to pixels the degree to which the colour value of a texture cell is included in the colour value of the area corresponding to the box filter in an embodiment of the present invention.

FIG. 6 is a diagram demonstrating in the same form as in FIG. 5 the interpolation area between adjoining texture cells for each magnification ratio of texture cells in relation to pixels. In other words, the degree to which the colour values of the texture cells J, K are included in the colour value of the box filter is expressed from the top of the drawing downwards in the form of triangles, inverted V-shapes and trapezoids. As the ratio of pixel width to texture cell width proceeds from 1:1 to 1:2 and 1:4, the width Wx of the interpolation area in the x direction between texture cells decreases in relation to texture cell width.

Here, filter size is increased by multiples of 2 in order to simplify processing, and in between is further determined by interpolation. To be more precise, interpolation where the magnification ratio is 1.5 is realised by calculating the mean between interpolation at 1:1 and at 1:2.

FIGS. 7–10 are each diagrams which compare the size of the box filter F according to the present embodiment with the size of a conventional box filter for each magnification ratio of texture cells in relation to pixels. For instance, in FIG. 8 the ratio of texture cell size to pixel size is 2:1 (4:1 in terms of area ratio).

Figure 7A:
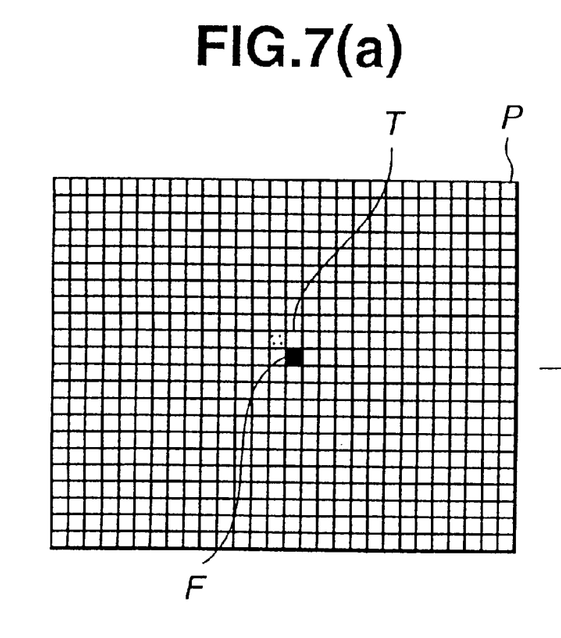
FIG. 7 is a diagram demonstrating the relationship between pixels, texture cells and box filter (a), the relationship between texture cells and box filter (b), and the relationship between texture cells and conventional box filter (c) where the ratio of pixel size to texture cell size is 1:1.
Figure 7B:
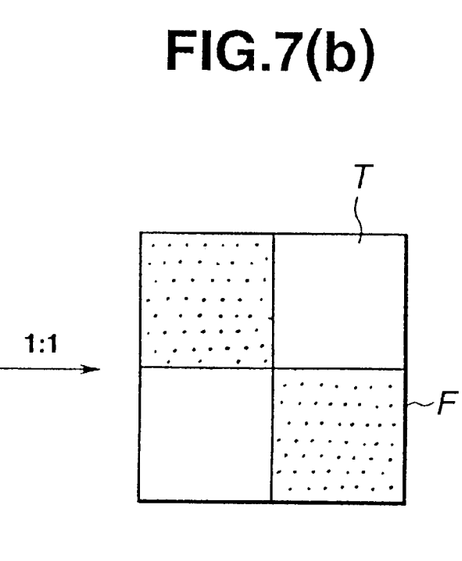
Figure 7C:
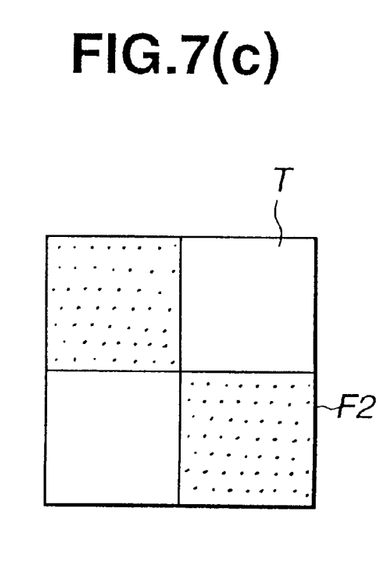
Figure 8A:
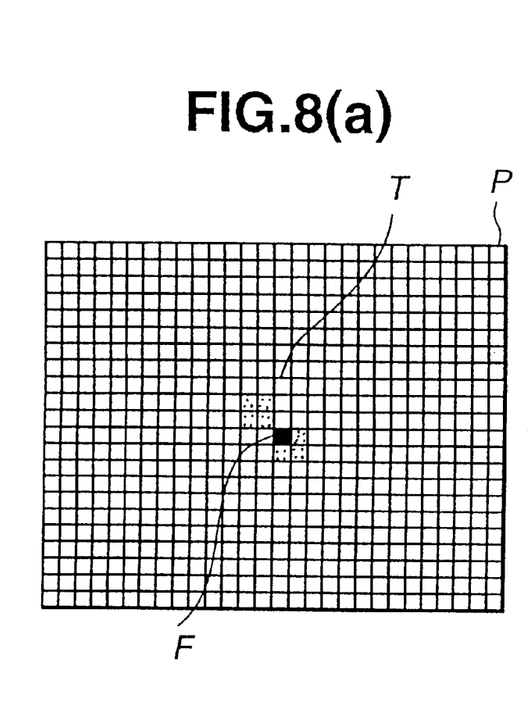
FIG. 8 is a diagram demonstrating the relationship between pixels, texture cells and box filter (a), the relationship between texture cells and box filter (b), and the relationship between texture cells and conventional box filter (c) where the ratio of pixel size to texture cell size is 1:2.
Figure 8B:
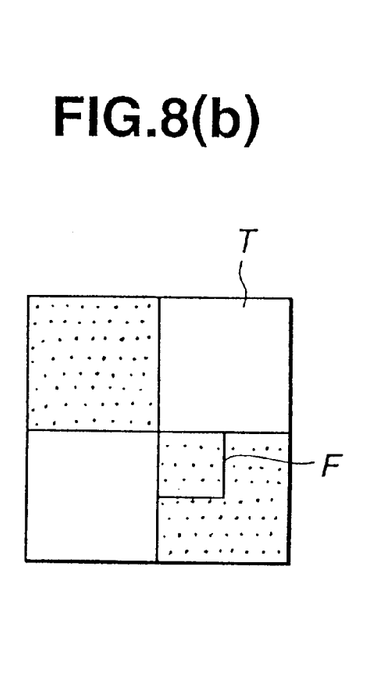
Figure 8C:
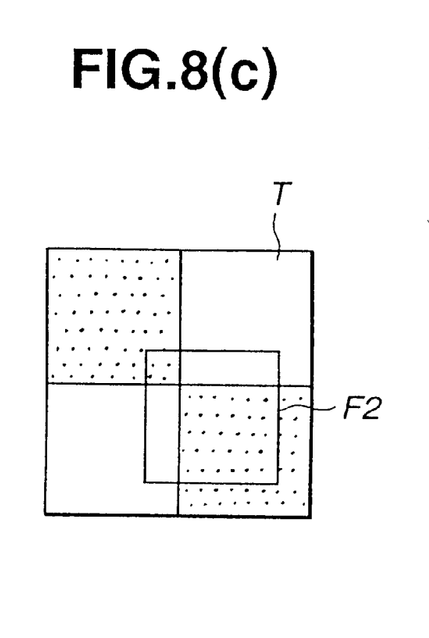
Figure 9A:
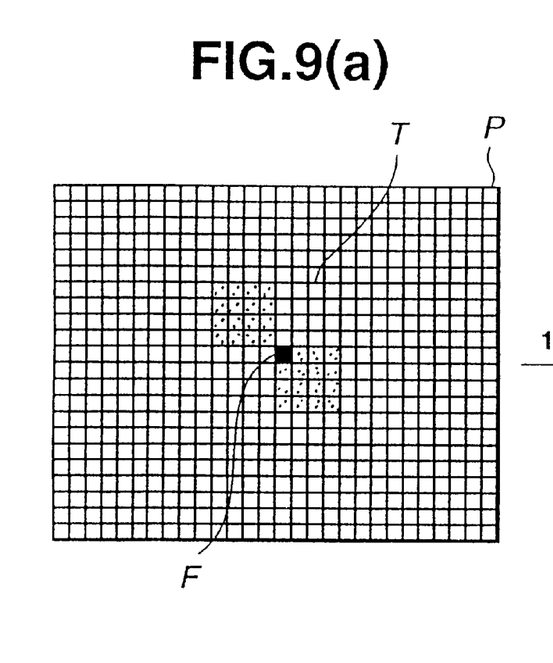
FIG. 9 is a diagram demonstrating the relationship between pixels, texture cells and box filter (a), the relationship between texture cells and box filter (b), and the relationship between texture cells and conventional box filter (c) where the ratio of pixel size to texture cell size is 1:4.
Figure 9B:
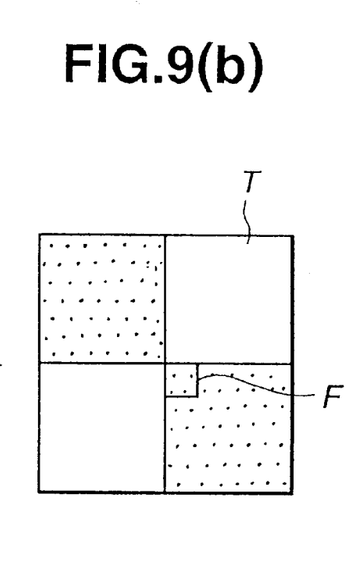
Figure 9C:
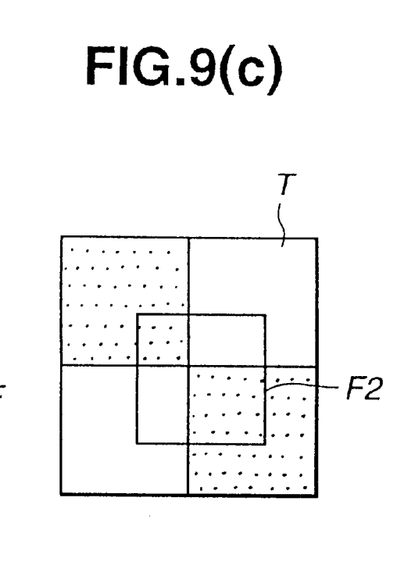
Figure 10A:
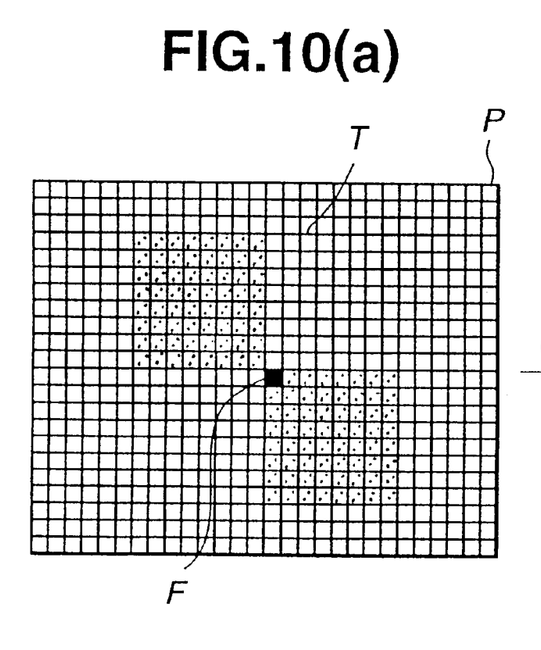
FIG. 10 is a diagram demonstrating the relationship between pixels, texture cells and box filter (a), the relationship between texture cells and box filter (b), and the relationship between texture cells and conventional box filter (c) where the ratio of pixel size to texture cell size is 1:8.
Figure 10B:
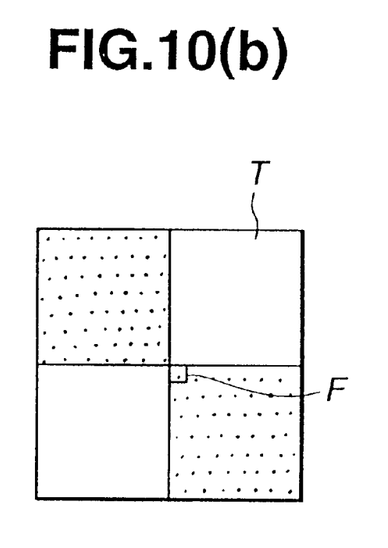
Figure 10C:
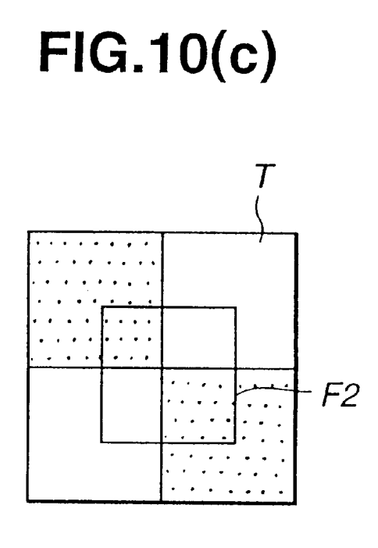

In each of FIGS. 7–10, (a) demonstrates the relationship between pixels P, texture cell s T and box filter F on the display image. In the drawings of display images, interpolation actually causes the edges to be fuzzy. Similarly, (b) demonstrates the relationship between texture cells T and box filter F, while (c) illustrates what happens when the box filter F is replaced with a conventional box filter F2 while maintaining the same scaling ratio as in (b) and without changing the position of the centre point. FIGS. 7, 9 and 10 illustrate what happens in the same way as FIG. 8 where the size ratios of the sides are 1:1, 1:4 and 1:8 respectively. The ratios shown between (a) and (b) in each of FIGS. 7–10 are area ratios.

Figure 11:
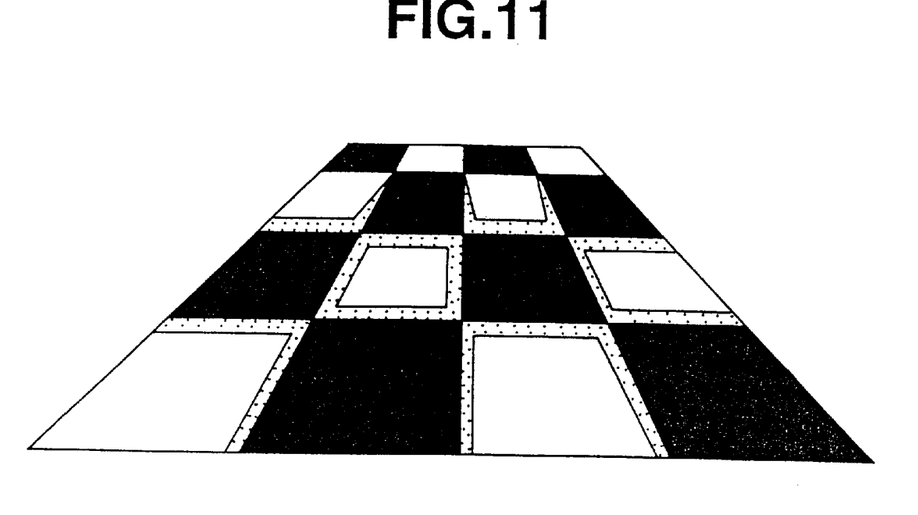
FIG. 11 is a diagram demonstrating the results of mapping texture in an embodiment of the present invention.

As FIGS. 7–10 (c) show, the size of the conventional box filter F2 is always the same as the size of the texture cell irrespective of the magnification ratio of the latter. This means that the area of fuzziness generated by the interpolation increases in line with the magnification rate of the texture cell., In contrast to this, FIGS. 7–10 (b) show that with the present embodiment the size of the box filter which determined the interpolation area decreases in relation to the size of the texture cell as this expands. Thus it is possible to obtain a sharp display image with no fuzziness at the edges. It should be added that FIG. 11 is a notional diagram illustrating a display image where the present embodiment has been applied to enlarging the texture of FIG. 13. In this drawing there is less fuzziness towards the front (bottom) than is the case with the conventional method (FIG. 14).

(3) Other Embodiments

The present invention is in no way restricted to the above embodiment, and encompasses other embodiments as will be demonstrated hereafter. For instance, in the above embodiment the size of the box filter F has been fixed at the same size as that of pixels irrespective of the magnification ratio of texture cells in relation to these. However, it is also possible to select a desired size for a side of the box filter, such as twice or three times the size of a pixel. This permits use of the most suitable size of box filter where the pixels are very fine in relation to the display image.

Moreover, Bagginess can become prominent if the interpolation area is limited to pixel size where the magnification ratio is great. Consequently, it is possible to alter the size of the box filter F in accordance with the magnification ratio. In other words, by increasing the size of the filter to a certain degree while maintaining a ratio which is smaller than the magnification ratio of the texture cells it is possible to reduce jagginess effectively in comparison with where the size of the filter is fixed (claim 3).

Furthermore, it is possible to determine the size of the box filter F by means of a function of pixel size and the size of the texture cells on the actual screen. The fact that this function can be selected at will makes it possible to obtain a display image which matches conditions such as image content and system configuration (claim 4).

For instance, if the size of a side of the interpolation area is a function obtained by integrating the square root of the magnification ratio, the scaling factor is only three times even where the magnification ratio is ten times. What is more, if PS is the size of one side of a pixel, TS the size of one side of a texture cell, and FS the size of one side of the box filter F, the magnification ratio M is TS/PS, and the size FS of one side of the box filter F can be determined by means of a formula such as the following. In the formula, a is a constant, while x to the power y, for example, is represented as x^y.

$$FS=(TS/PS)^a$$

Here, if the constant a=1, the filter size FS is proportionate to the magnification ratio M of the texture cell size TS in relation to pixel size PS, whereas if the constant a=0.5, a filter size is obtained which utilises the characteristic of the square root of the magnification ratio alluded to above.

In this manner it is possible to eliminate excessive fuzziness while at the same time reducing Bagginess, because the size of the box filter F is magnified to a certain extent if the magnification ratio of the texture cells is increased.

Meanwhile, if a fixed size of box filter is employed according to the magnification ratio of the texture cells (ie twice, eight times etc.), and the texture interpolator is equipped with a special processing circuit is provided for each filter size, processing becomes even faster. It should be added that a storage medium on which is stored a computer program for implementing the method to which the present invention pertains forms a further aspect of the present invention.

As has been described above, the present invention employs texture interpolation to prevent Bagginess generated on the edge during magnification of texture images from becoming prominent, while making it possible to improve on the excessive fuzziness of the edge which has hitherto been problematic.

What is claimed is:

1. An image-processing device, having means for interpolation in which during mapping of texture cells representing the surface pattern of the object which is to be displayed, colour boundaries are interpolated by blending the colours of the texture cells contained within prescribed limits, wherein said means of interpolation comprising:

means for determining size, in which the size of filter for stipulating the area which is subject to interpolation is determined:

means for determining position, in which a filter of the stipulated size is moved one by one over the texture cells which are to be mapped, and the position is determined;

means for extracting, in which the colour values of the texture cells which overlap with the filter in each position are extracted;

means for blending color values, in which extracted color values for every texture cell are blended in proportion to the area of overlap between the texture cell in question and the filter; and means for mapping, in which the blended color values are mapped on each pixel which corresponds to a position of the filter.

2. The image-processing device according to claim 1, wherein said image-processing device further comprises means for calculating the magnification ratio, in which the magnification ratio of the texture cells in relation to the pixels is calculated and wherein said means for determining size determines said size of filter in accordance with the calculated magnification ratio.

3. The image-processing device according to claim 1, wherein said means for determining size is structured in such a manner that the size of said filter is magnified by a ratio which is smaller than the magnification ratio of the texture cells in relation to the pixels.

4. The image-processing device according to claim 1 or claim 3, wherein said means for determining size is structured in such a manner that the size of said filter is determined by means for the magnification ratio of said texture cells in relation to the pixels, and a prescribed function.

5. A method of image-processing, including a process of interpolation in which during mapping of texture cells representing the surface pattern of the object which is to be displayed, color boundaries are interpolated by blending the colours of the texture cells contained within prescribed limits, wherein said process of interpolation comprises the steps of:

determining the size of filter for stipulating the area which is subject to interpolation;

determining position, in which a filter of the stipulated size is moved one by one over the texture cells which are to be mapped, and the position is determined, extracting, in which the color values of the texture cells which overlap with the filter in each position are extracted;

blending color values, in which extracted color values for every texture cell are blended in proportion to the area of overlap between the texture cell in question and the filter; and mapping, in which the blended colour values are mapped on each pixel which corresponds to a position of the filter.

6. The method for image-processing according to claim 5, wherein the method for image-processing further comprises a step for calculating the magnification ratio of the texture cells in relation to the pixels and wherein the step for determining the size of filter stipulates the area in accordance with the calculated magnification ratio.

* * * * *